UNITED STATES PATENT OFFICE.

NIELS K. ANDERSEN, OF OAKLAND, CALIFORNIA, ASSIGNOR OF ONE-THIRD TO CHARLES DUTHIE, OF SAN MATEO, CALIFORNIA.

PROCESS OF MANUFACTURING ARTIFICIAL MARBLE.

1,105,950. Specification of Letters Patent. Patented Aug. 4, 1914.

No Drawing. Application filed April 21, 1913. Serial No. 762,711.

*To all whom it may concern:*

Be it known that I, NIELS K. ANDERSEN, a subject of the King of Denmark, residing at Oakland, in the county of Alameda and State of California, have invented new and useful Improvements in Processes of Manufacturing Artificial Marble, of which the following is a specification.

My invention relates to a compound in imitation of marble and like material, and in a means for forming a body part and a facing therefor, as will be more fully described in the following specification.

In the preparation of the body portion of my compound I take 40 parts of magnesium oxid (MgO), 1 part of acetate of lead and 16 parts of finely powdered silica and mix these together dry. I then take chlorid of magnesium, dissolve it in water and gage it by hydrometer measure to what is known on such gages as "22½ B," and then take sulfate of zinc, dissolve it in water and gage it to 30 B in the same manner as the magnesium chlorid. I then take 98 parts of the gaged magnesium chlorid and 2 parts of the gaged sulfate of zinc and mix these together. Next I take the dry mixture already described and mix it with enough of the last named mixture to make the whole of the consistency of cream. I then take 43 parts of filler which may be composed of coarse silica, hardwood sawdust, ashes, asbestos, marble dust, or equivalent suitable material, which I use singly or mix one or several together to suit the texture, weight, hardness or flexibility required for different purposes the material is to be used for and add this to the former mixture. If this is too stiff, enough of the magnesium chlorid and sulfate of zinc mixture may be added to make it plastic. In order to provide the proper facing for this compound, I take 50 parts of finely ground magnesium oxid (MgO) and 1 part acetate of lead and mix them dry. I then mix this with enough of the magnesium chlorid and sulfate of zinc mixture, described in specification for mixing body part, to make the mixture like thick cream. To this I add 49 parts of filler, the nature of which may be varied according to the surface required. Thus for a non-porous, hard, stone-like surface I use finely powdered silica, marble dust, etc., but where a more flexible surface is required, as for tables or counter-tops, I use very fine hardwood sawdust, ashes and similar material. I mix the filler very thoroughly with the wet mixture and if this is too stiff I add enough of the gaged magnesium chlorid solution described to make it like paste. In cases where a very strong surface is required and the color of the material allows it, I use 99 parts of magnesium oxid and 1 part of acetate of lead and mix them dry. Then I take 98 parts magnesium chlorid gaged to 30 B and 2 parts of sulfate of zinc gaged to 30 B, mix these and add to first mixture. All coloring used must be mixed with the material used for facing and care must be taken to avoid any water or filler containing lime. In forming articles from this compound, I first take sheets of glass or polished metal of the size of slabs required and place around this frames of wood, glass or metal. The face of the mold is then dampened by magnesium chlorid, gage 22½ B, and the facing material is first poured into the mold to the desired thickness. This material may be then grained or any desired pattern or picture may be designed upon it. The body material is then poured in to any required thickness and will unite with the facing material. It is then left to set in a room heated to 60° Fahrenheit. When it has set, it may be removed from the mold and the facing material will have a polish equal to glass; no subsequent rubbing or work of any kind being required as a finish.

Imitations of the tile may be made in large sheets like marble and the joints may be imitated by marking off any required size, after initial set, so that the tile may resemble brick or other forms. Molds may be similarly made for casting furniture, caskets, mantels, ornamental caps, columns, moldings, etc., and these molds may be made of glass or polished metal. The casts may be reinforced, if required, by wood or metal. Tiles or other articles made in this manner are ready for use, when removed from the mold and properly hardened, and have a very superior polish and require no other work, thus greatly reducing their cost.

Having thus described my invention, what I claim and desire to secure by Letters Patent is—

The hereindescribed process of manufacturing artificial marble and the like, which consists in forming a pasty facing composition therefor by successively mixing together magnesium oxid and lead acetate in a dry state, mixing with the dry mixture a mixture of dissolved magnesium chlorid and dissolved zinc sulfate, and adding a filler to the resultant mixture; pouring the facing composition into a mold; forming a composition for the body of the marble by successively mixing together magnesium oxid, lead acetate and silica in a dry state, mixing with this dry mixture a mixture of dissolved magnesium chlorid and dissolved zinc sulfate, and adding a filler to the resultant mixture; pouring the body composition into said mold upon the facing composition therein; and allowing said compositions to unite and set.

In testimony whereof I have hereunto set my hand in the presence of two subscribing witnesses.

NIELS K. ANDERSEN.

Witnesses:
JOHN H. HERRING,
W. W. HEALEY.